United States Patent [19]

Kai

[11] Patent Number: 5,580,606
[45] Date of Patent: Dec. 3, 1996

[54] METHOD FOR FORMING INTERFERENCE ANTI-REFLECTIVE COATINGS BY PLASMA SURFACE MODIFICATION

[75] Inventor: Fu J. Kai, Singapore, Singapore

[73] Assignees: Singapore Institute of Standards etc.; Polycore Optical Pte Ltd, both of Singapore, Singapore; a part interest

[21] Appl. No.: 540,126

[22] Filed: Oct. 6, 1995

[51] Int. Cl.$^6$ .................................................. B05D 3/06
[52] U.S. Cl. .......................... 427/164; 427/489; 427/491; 427/563
[58] Field of Search .................................. 427/489, 491, 427/563, 574, 575, 579, 164

[56] References Cited

U.S. PATENT DOCUMENTS 4,394,177  7/1983  Fujioka et al. ............... 106/287.14
4,525,421  6/1985  Kubota et al. ........................ 428/412

FOREIGN PATENT DOCUMENTS

2070776  3/1990  Japan.
2069585  3/1990  Japan.

Primary Examiner—Shrive Beck
Assistant Examiner—Erma Cameron
Attorney, Agent, or Firm—Bruce H. Johnsonbaugh

[57] ABSTRACT

This invention relates to methods of forming interference anti-reflective, abrasion resistant and easy to clean coatings on plastic articles by improved microwave plasma modification to obtain a coating with stable layer thickness and a refractive index as low as 1.29–1.35, which is formed from organic silicon compounds.

10 Claims, 6 Drawing Sheets

METHOD FOR FORMING INTERFERENCE ANTI-REFLECTIVE COATINGS BY PLASMA SURFACE MODIFICATION

BACKGROUND OF THE INVENTION

This invention relates to methods of forming interference anti-reflective, abrasion resistant and easy to clean coatings on plastic articles by improved microwave plasma modification.

Anti-reflective coating is very popularly used for optical components, infrared sensors and ophthalmic lenses. These optical articles need very low reflectance in special wavelength bands, for instance, 550 nanometers (nm) for ophthalmic lenses and 950 nm for near infrared sensors.

The term "interference anti-reflective coating" used herein refers to a coating with quarter wavelength optical thickness in which the reflectance at minimum point on the spectral reflectance curve shall not exceed 1.6% when the refractive index of the substrate is 1.48–1.50 according to the test prescribed by military specification MIL-C-675C.

Various methods to form the coatings are commercially available. Vacuum evaporation process is a common method of forming single or multilayer interference anti-reflective coatings. This process requires a high level of skill and expensive equipment for manufacturing.

The sputtering process is another vacuum process to form interference anti-reflective coatings. However, this type of equipment for the sputtering process also is very expensive and the process is very difficult to control.

Plasma surface treatment is one significant alternative option. It is a simple and low cost process to form anti-reflective coatings. A method using glow discharge treatment of an organo-silica taught by Masso, U.S. Pat. No. 4,478,873, is known. However, this method can only produce a low reflective coating, reducing the reflectance from 6.8% to 4.2%, and no anti-reflective interference layer according to MIL-C-675C is formed. Masso does not teach how to obtain an interference anti-reflective coating or how to obtain the coating with durable qualities.

U.S. Pat. No. 4,940,602, Taniguchi, teaches a method of forming a fluorine-containing polyorganosiloxy film by the process known as spin coating. '602 limits the index of refraction of the hard coating materials to be not less than 1.52. '602 uses plasma surface treatment to clean the surface to obtain good adhesion between the hard coating and the top anti-reflective coating. Fletcher, in U.S. Pat. No. 4,137,365, uses glow discharge plasma polymerized vinyl- trimethoxysilane to form a low reflective coating. However, the transmittance achieves only 85% at 550 nm. Various treatments have been used for curing, hardening processes as disclosed in U.S. Pat. No. 5,051,308, U.S. Pat. No. 5,156,882, and EP 252,870.

Through normal plasma processes many organic silicon coatings will be ashed, peeled or separated from their substrate and lose the adherence between coating and substrate. To obtain the desired interference property, a stable layer thickness is necessary. This is not only a problem of film thickness but more importantly it is an option of starting material, which will be able to withstand deep structure modification (thicker than 50 nm) without cracking and shall be able to achieve a certain layer thickness (thinner than 500 nm) without further interaction with other layers. If the layer is too thin or too thick, the coating will lose its interference properties.

Yet another object is to obtain a coating with stable layer thickness and a refractive index as low as 1.29–1.35, which is formed from organic silicon by an improved microwave plasma modification. This is one of the main objectives of this invention. This is a basic condition for forming an interference anti-reflective coating.

Another objective is to obtain a high forming rate of the interference anti-reflective layer. This is very important for mass production.

Still another objective is to obtain the interference anti-reflective layer which has good abrasion resistance and good chemical resistance.

SUMMARY OF THE INVENTION

The present invention relates to the production of interference anti-reflective coatings on plastic articles by improved microwave plasma modification. The minimum reflectance will be less than 1% at wavelength of 550±50 nm. The coating presents an interference color of purple. The coating has good abrasion and chemical resistance.

The invention is useful for ophthalmic lenses. The other applications include optical components for cameras and other instruments, protective cover for screen and other displays, the design minimum reflectance wavelength may be different from 500 nm, which is used for ophthalmic lenses.

The present invention provides hard coatings as starting materials for plasma modification and the entire process of producing a durable interference anti-reflective coating on plastic articles.

The whole production process includes three steps:

(1) coating a suitable substrate with long-chain organo-silica (with a thickness of 2–3 μm) on an allyl diglycol carbonate substrate, such as "CR39™" available form Pittsburgh Plate Glass Industry. Other optical plastic materials may be used as acceptable substrates within the present invention, by a dipping process;

(2) curing the coated substrate by subjecting to a microwave plasma chamber to obtain interference anti-reflective coating (100–600 nm); and (3) immersing the substrate with plasma anti-reflective coating into a solution containing fluorine components to obtain a protective layer thereon.

DETAILED DESCRIPTION OF THE PREFERRED EMBODIMENTS

The plasma anti-reflective coating in this invention is an interference anti-reflectance coating. The term "interference anti-reflective coating" used herein means a coating of the present invention with a very low refractive index from 1.26 to 1.32 in the region of wavelength from 400 nm to 1.1 μm and with a certain thickness of one quarter wavelength optical thickness or three quarter wavelength optical thickness at the design wavelength. By one quarter wavelength optical thickness is meant a coating thickness of from about 100 nm to about 225 nm; and by three quarter wavelength optical thickness is meant a coating thickness of from about 300 nm to about 675 nm. For ophthalmic applications, the design wavelength optical thickness preferably should be about 550±50 nm.

The interference anti-reflective article of the present invention includes a transparent plastic substrate. An allyl diglycol carbonate material was used as the substrate in the invention. Any type of organic polymeric plastic substrate may be used, i.e., a polycarbonate substrate. The particular preferred carbonate used is "CR39™" available from Pittsburgh Plate Glass Industries. CR39™ is a polydiethylene glycol bis(allyl carbonate) obtained from PPG Industries, Inc. Other optical plastics, for instance, acrylic polymethyl methacrylate, styrene polystrene, methyl methacrylate, styrene copolymer and polycarbonate also may be used for forming the substrate.

A hard coating was dipped on the plastic substrate as a starting material to form the interference anti-reflective coating and protect the surface of the substrate. From about 50 to about 800 parts by weight of at least one organic silicon compound selected from the group consisting of silicon-containing compounds represented by the general formulas hereinafter described in detail. The term "hard coating" used herein means a coating having a pencil hardness of 4H or more as determined by the method according to ASTM D3363. ASTM D3363 is a standard method for film hardness by pencil test, a procedure for determination of the film hardness of an organic coating by drawing pencil leads of known hardness. Other coating processes may be used for forming the hard coating, for instance, spraying, spinning and other methods commonly used to form over coating in the plastic industry. The coating thickness shall not be less than 1 μm.

If the coating is less than 1 μm, the plasma anti-reflective coating with good adhesion as determined by the method according to military specification MIL-C-48497A may not be obtained. This specification establishes minimum quality and durability requirements for single layer and multilayer interference coatings that are primarily used within the protective confines of sealed optical systems.

The hard coating material is an organic silicon, which has an alkyl side chain directly bonded to a silicon atom and containing at least three subsequent carbons. The monomer is represented by the formula, in which:

$R^8$ is selected from the group consisting of alkyl having 1–4 carbons, inclusive, vinyl, carbonate and carbonyl;

$R^9$ is selected from the group consisting of methyl, ethyl, propenyl, methoxy and ethoxy; and $R^{10}$ is an alkyl group having 1 or 2 carbon atoms.

The first preferred material in the invention is a composition including:

(a) at least one organic silicon compound represented by the general formula wherein $R^1$ is selected from the group consisting of alkoxyalkyl having 4 to 7 carbon atoms with at least a three carbon atom chain bonded directly to the silicon atom, and optionally substituted with vinyl, carbonate, carbonyl and methacryloyloxy; $R^2$ is an alkyl group having from one to four carbon atoms, inclusive; and $R^3$ is selected from the group consisting of an alkyl having from one to five carbon atoms, inclusive, and hydrogen; and m is 0 or one;

(b) about 100 parts by weight selected from the group consisting of colloidal silica or organic titanium compounds;

(c) about 50 to about 600 parts by weight of at least one polyfunctional epoxy compound; and (d) from about 0.01 to about 5.0 percent by weight of a compound selected from the group consisting of a curing catalyst, such as magnesium perchlorate, ammonium chloride, ammonium perchlorate and the like.

The above composition is disclosed in U.S. Pat. No. 4,525,421 by Kubota et al.

Hydrolysis of copolycondensate of gamma-glycidoxypropyl trimethoxysilane with colloidal silica coating material, in which 6 carbon atoms may be bonded directly to a silicon atom is preferred in the present invention. The composition is disclosed in U.S. Pat. No. 4,394,177 by Fujioka.

An organo siloxane is also preferred in this invention. The composition is disclosed in Japanese Patent 38419 (1981) by Sakata. It contains 3 carbon atoms directly bonded to a silicon atom and one alkoxyalkyl group containing carbonate functionality. The general formula is as follows, This is a carbonate composition with disilane compound (wherein A is a carbonate group with at least seven carbon atoms and 2 valence functionalities, $R^4$ and $R^5$ may be the same or different types of alkyl having from one to five carbon atoms, inclusive, or alkoxyalkyl groups; and $R^6$ and $R^7$ are the same or different types of alkyl groups having four to seven carbon atoms).

The hard coatings must be organo-silicon with an alkyl side chain directly bonding to a silicon atom and containing at least three subsequent carbons. Only the organo-silicon with enough carbon atoms directly bonded with the silicon atom can form the interference anti-reflective layer because the materials are easily modified to a porous inorganic silica-like material with a low index from 1.26 to 1.32. Similarly, only the compounds having organo-silicon with enough carbon atoms directly bonded with the silicon atom may form a stable layer having quarter wavelength optical thickness with a high forming rate and still keep the good adhesion with the substrate.

A hard coating material contains or comprises 100 parts by weight of tetraethoxysilane, (TEOS) Si—$(OCH_2CH_3)_4$, which can be obtained from Wako Pure Chemical Industries Ltd., 800 parts by weight ethanol and 35 parts by weight water plus hydrogen chloride (HCl) (40%) until a pH of 3 is achieved. This hard coating material was coated on CR39™ substrate. This hard coating material contains an organo silicon which does not have carbon atoms directly bonded to the silicon atom. After plasma modification the reflectance of the coating drops from 7% to 5% and the reflective curve is flat in visible regions. The interference anti-reflective coating may not be obtained at this stage prior to the curing step.

Figure 1:
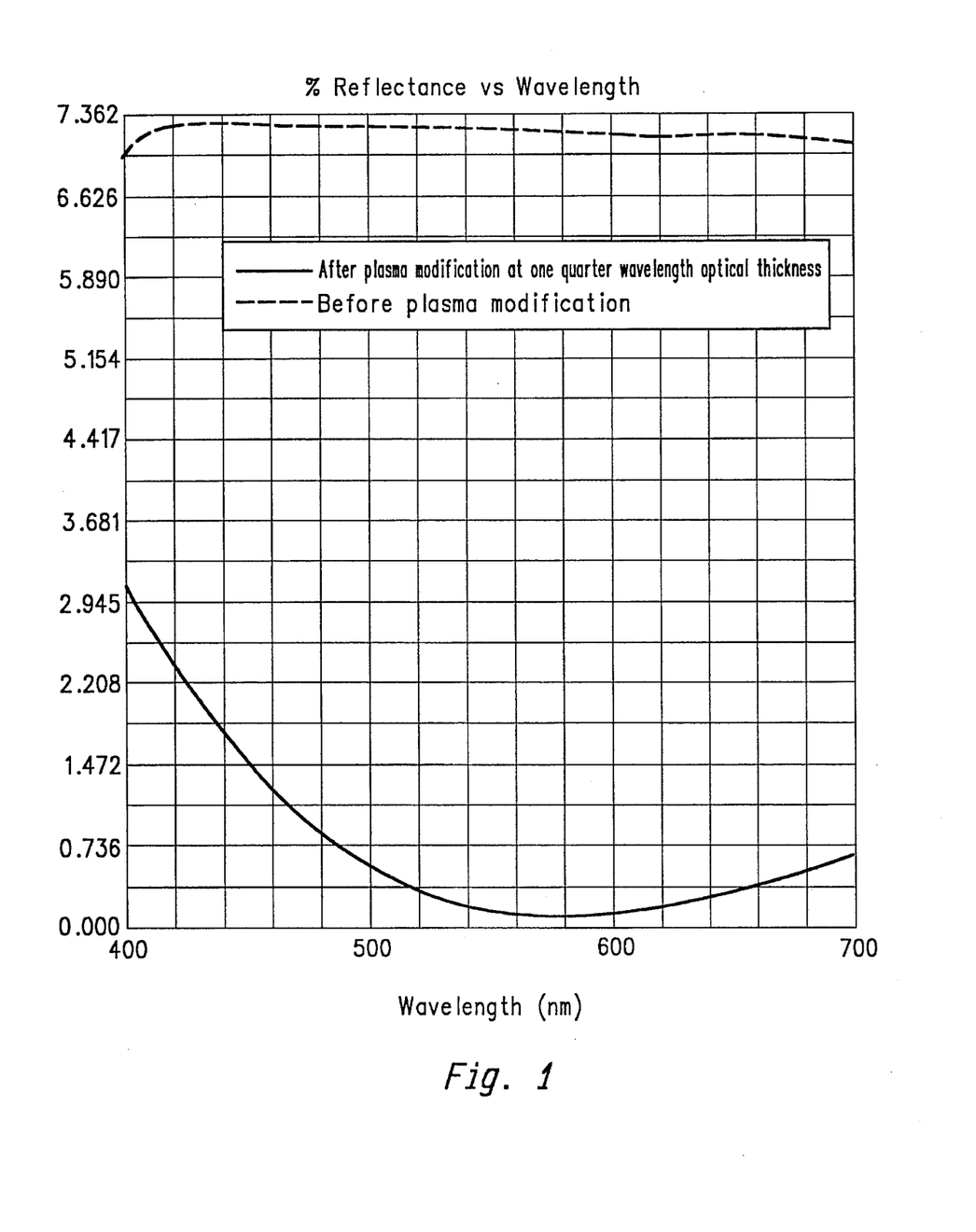
FIG. 1 shows the reflectance of an interference anti-reflective coating with one quarter wavelength optical thickness at 550 nm and the reflectance before the plasma modification.
Figure 2:
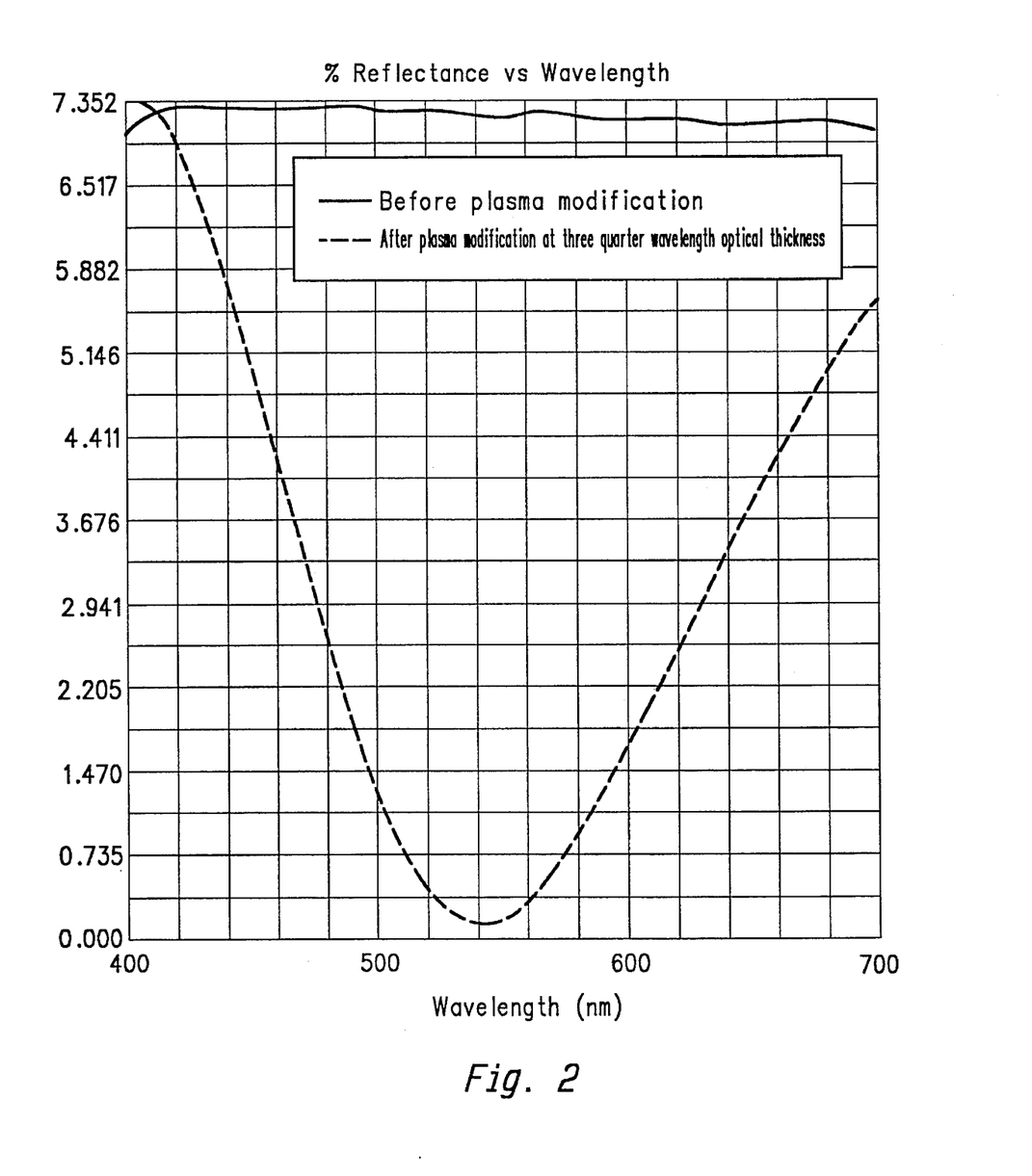
FIG. 2 shows the reflectance of interference anti-reflective coating with three quarter wavelength optical thickness at 550 nm and the reflectance before the plasma modification.
Figure 3:
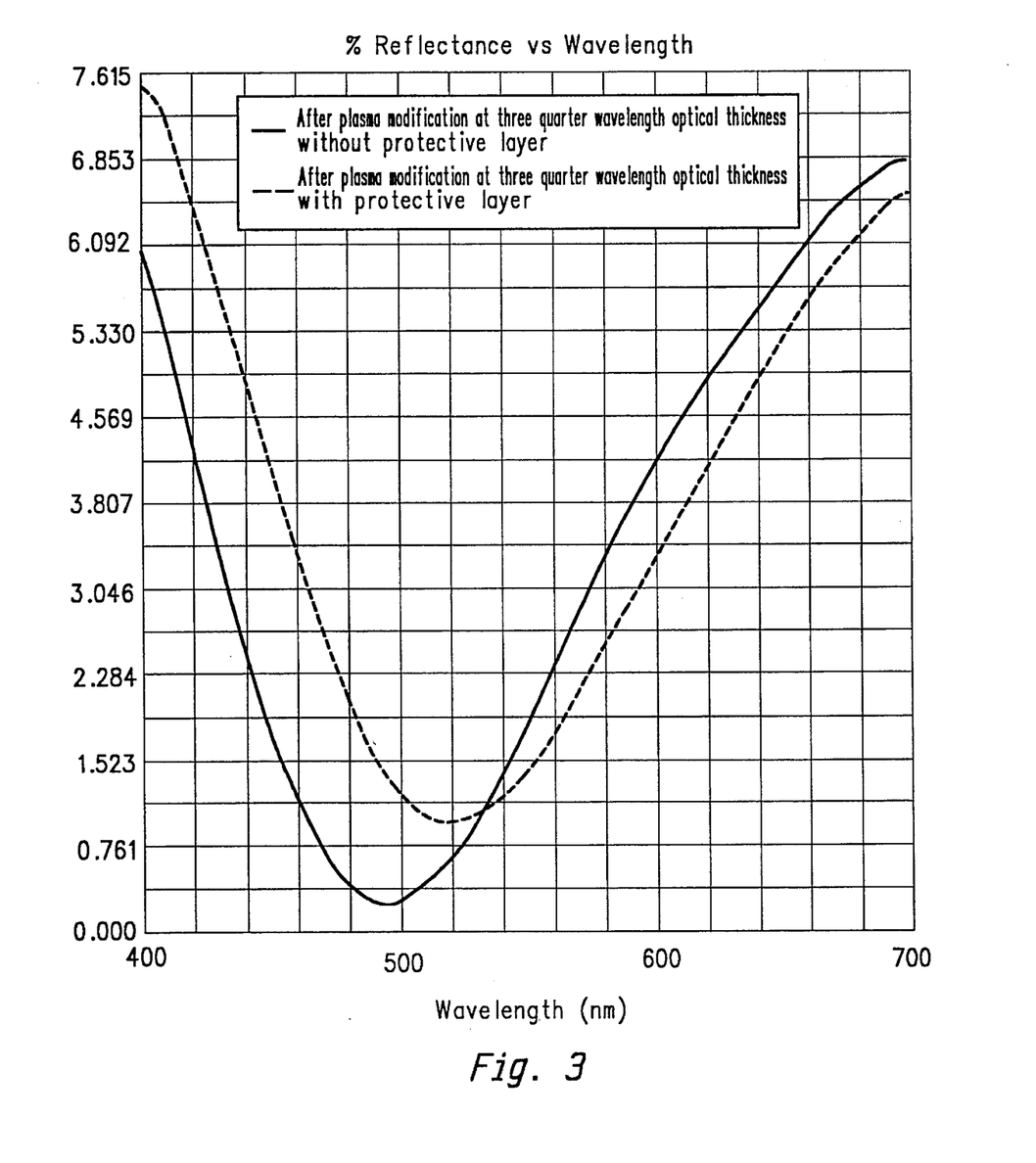
FIG. 3 shows the reflectance of plasma anti-reflective coating with and without a protective layer.
Figure 4:
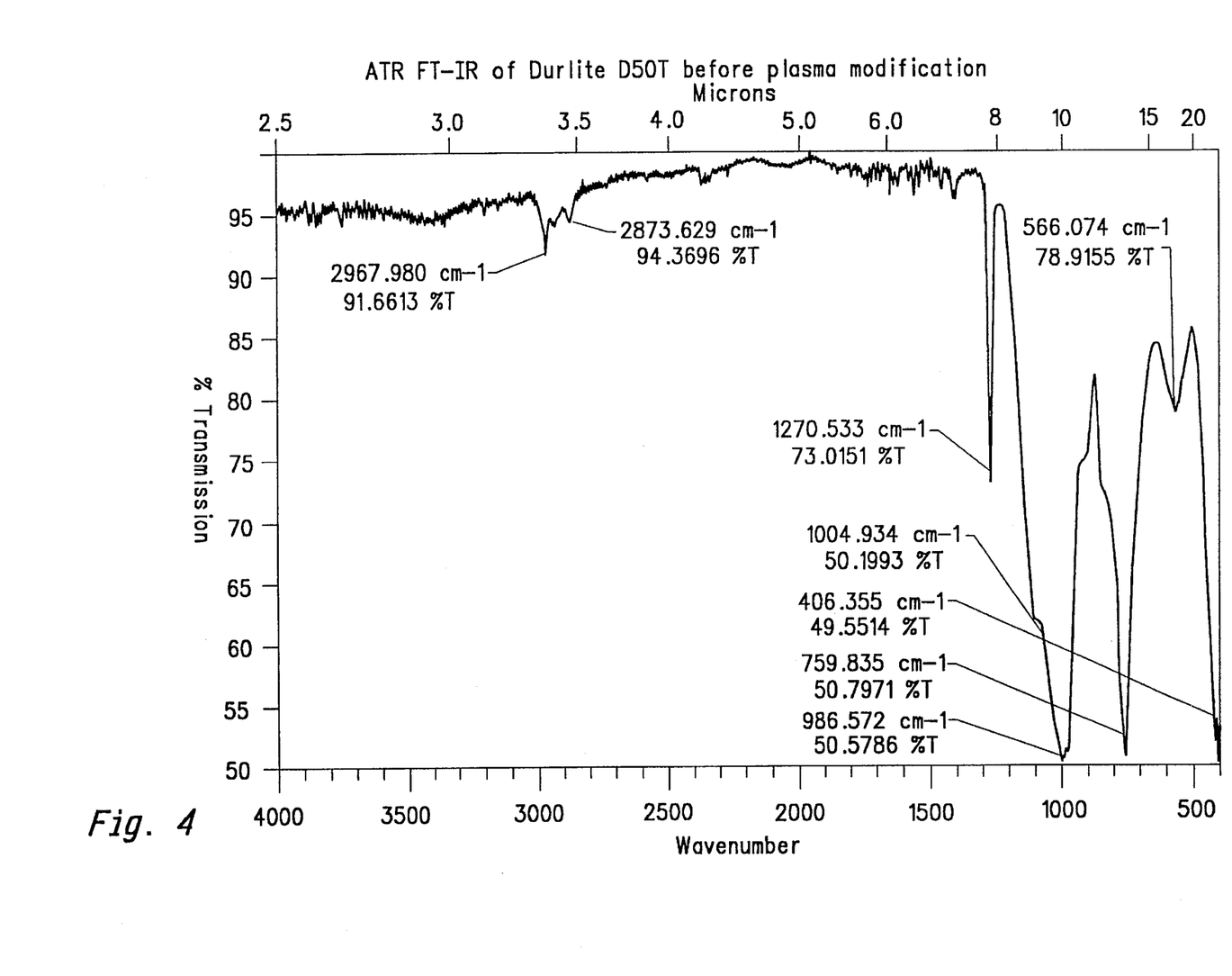
FIGS. 4 and 5 show the infrared spectrum of hard coating Durlite.
Figure 5:
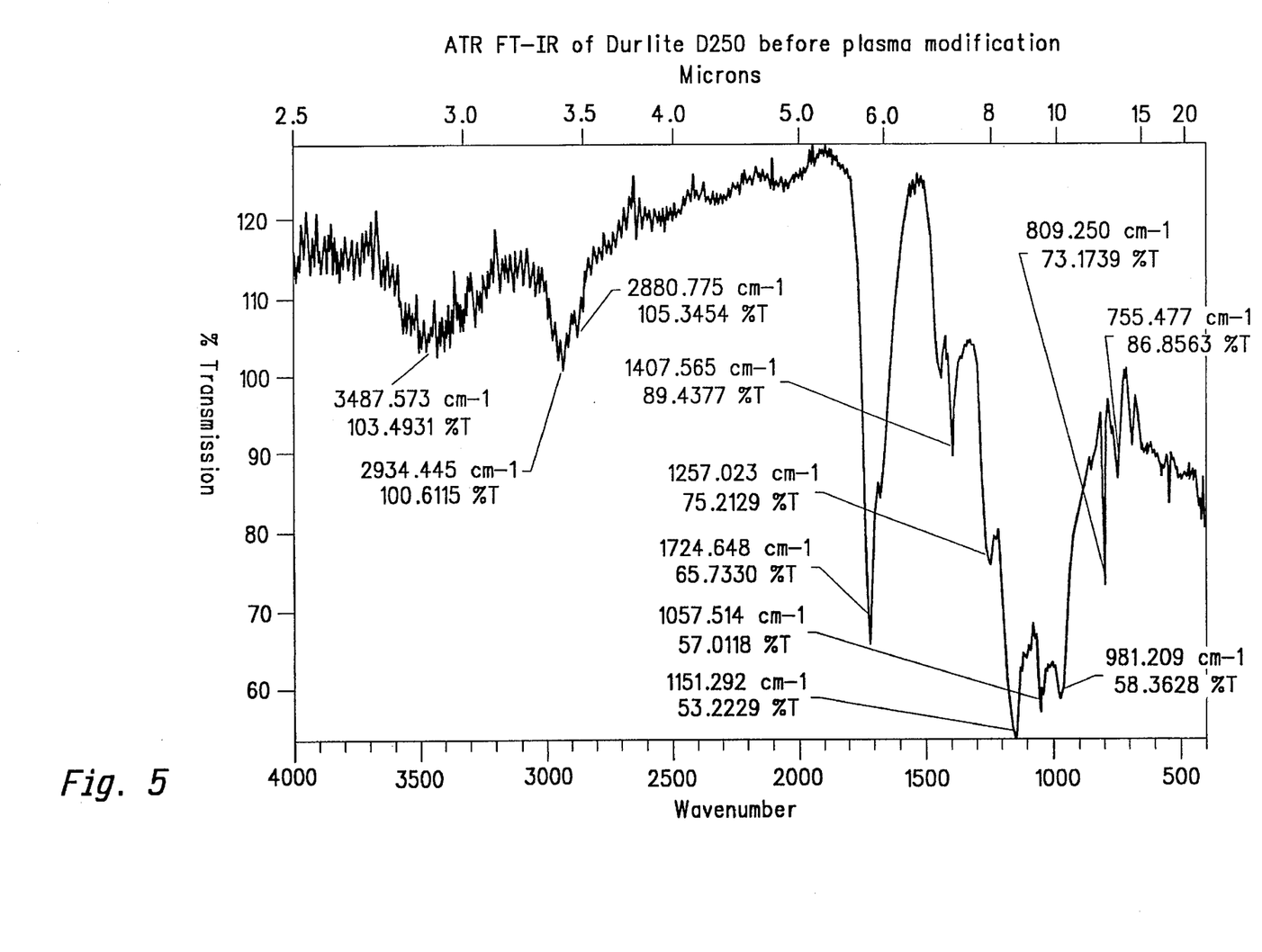

A hard coating material (Durlite) defined by infrared spectrum FIG. 4 and FIG. 5 is an organic silicon including one or two carbon atoms directly bonded with the silicon atom. Durlite can be obtained from Dimension Lavis of France. The reflectance of the coating after improved plasma modification of this invention was reduced from 7% to 5% and the interference anti-reflective coating can not be formed at this stage without an additional curing step.

To form the interference anti-reflective coating it was found that the plasma source for the modification process was not important. However, the forming rate of the anti-reflective layer was significantly affected and different. The improved and preferred plasma of the present invention is a microwave plasma. It was found the forming rate using a microwave plasma was five to ten times greater than using a conventional AC(60 Hz) plasma. To obtain the interference anti-reflective coating without any damage, it was found that the type of plasma is another important factor.

Downstream microwave plasma is preferred in the invention. The term "downstream" means that the plasma hitting the surface, which is prepared to form a interference anti-reflective coating, is coming from top with 45° to the normal of the surface. Preferably, the downstream microwave plasma generating region is within an angle of 0–30 degrees to the surface of the substrate. The interference anti-reflective coating may not be obtained if the plasma comes from the side of the surface to be treated because the coating will be cracked or damaged. The parameters of the plasma such as type of gas, pressure of the gas and power may be optimized to obtain the high forming rate without damage on the surface. Oxygen gas is preferred in the present invention.

Figure 6:
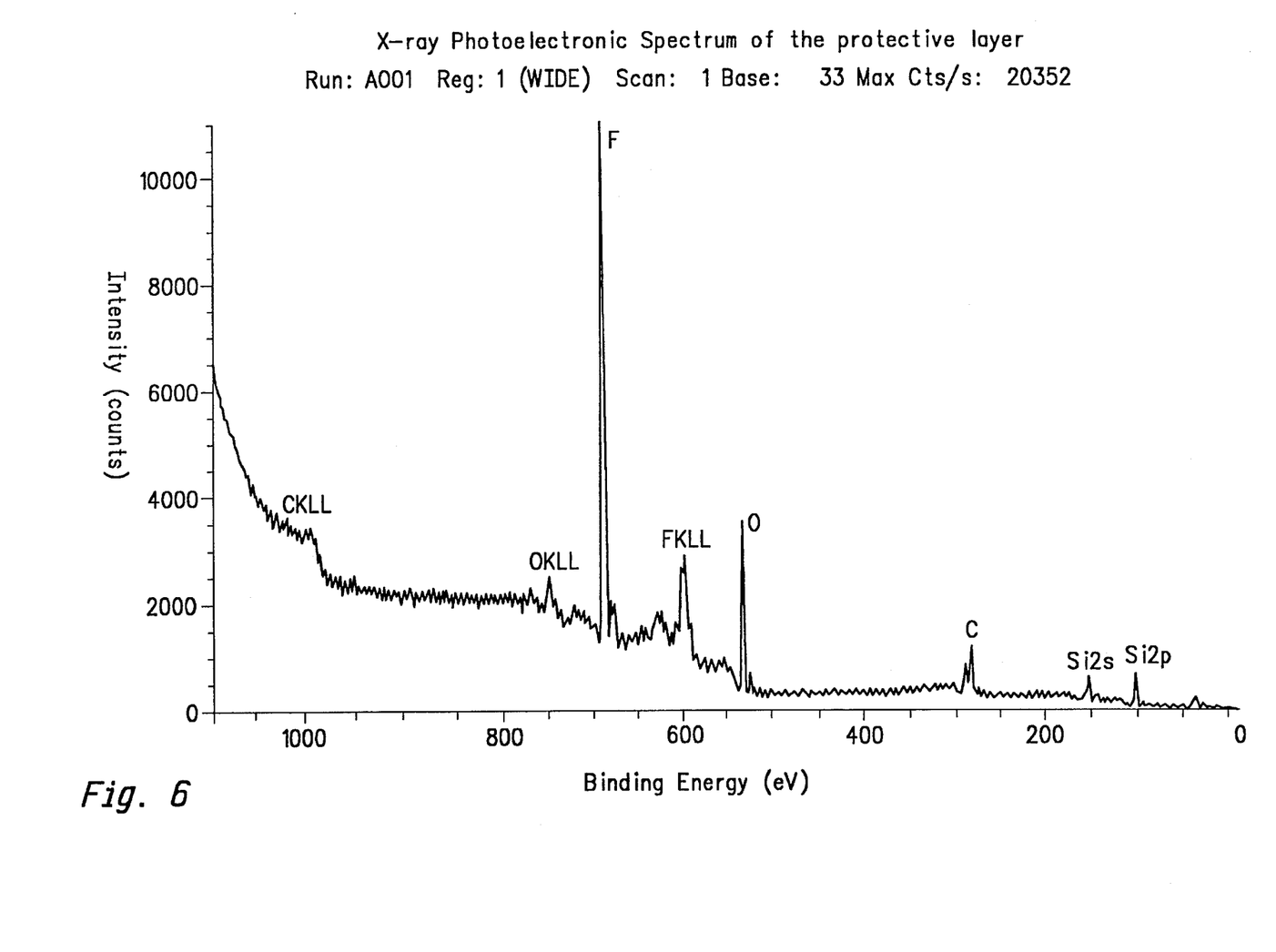
FIG. 6 shows an X-ray photoelectronic spectrum of a protective layer.

Generally, the plasma anti-reflective coating is soft and difficult to clean. The surface treatment uses hydrophobic solution, which is a fluorine containing silane defined by X-ray photoelectron spectrum, as shown in FIG. 6, was used in the invention. The solution of the fluoro-type resin, which has good water repellent properties and a refractive index lower than 1.35, may be obtained commercially from market. The hydrophobic materials are absorbed by the anti-reflective coating formed by the plasma process producing a protective layer with a thickness lower than 10 nm on the top surface. After this treatment, the formed interference anti-reflective coating was passed in the tests of moderate abrasion, salt solubility, acetone and isopropanol resistance according to the military specification MIL-C-48497A.

Embodiments of the present invention result in the formation of articles with interference anti-reflective coatings having good moderate abrasion, chemical resistance and free of damage such as microcracks. The present invention provides the starting coating materials and a whole process to form the optical, mechanical and chemical properties of the interference anti-reflective coatings.

EXAMPLES

The following examples are intended for illustrative purposes only and should not be construed as limiting of the invention.

The optical properties were measured by a spectrophotometer which has a working region of wavelength from 400 nm to 1.1 μm. The coating thickness and refractive index were obtained upon optical interference theory from the measuring results of the reflectance.

The testing method of the adhesion property was based upon military specification MIL-C-48497A.

The testing method of moderate abrasion was according to military specifications MIL-C-48497A described hereinabove.

The testing method of salt solubility and acetone/isopropanol resistance was also based upon MIL-C-48497A.

Example 1

A CR39™ polycarbonate lens coated with Kubota coating described above was subjected to a microwave (2.4 GhZ) downstream oxygen plasma with gas pressure 0.14 mbar and power 400 watts. After 5 minutes the reflectance of the lens dropped from 7.3% to 0.1% at 550 nm (one quarter wave optical thickness) and lower than 2% in total visible region (called broad band anti-reflective coating). After 12 minutes the three quarter wavelength optical thickness film at 550 nm was obtained. A forming rate of 27 nm per minute and a refractive index of 1.28 were obtained. The reflectance dropped to 0.3% at 550 nm produced and a strong purple color (called "colored anti-reflective coating"). The obtained interference anti-reflective coating was immersed in a fluorine containing hydrophobic solution. A durable interference anti-reflective coating was obtained.

Example 2

A CR39™ lens coated with Sakata coating was subjected to the above plasma for 15 minutes. The reflectance dropped from 6.9% to 1.1% at 550 nm. A forming rate as 21 nm per minute and refractive index as 1.29 were achieved. The colored interference anti-reflective coating was obtained.

Example 3

A CR39™ lens coating with Fujioka coating was subjected to the above plasma for 25 minutes. The reflectance dropped from 7.3% to 1.3% at 550 nm, a forming rate of 13 nm per minute and refractive index of 1.30 were achieved. The colored interference anti-reflective coating was obtained.

Example 4

A CR39™ lens coated with Sakata coating was subjected to an AC plasma (60 Hz) with gas pressure 0.1 mbar and 1 KV voltage/200 mA current for three hours. The reflectance dropped to 4.2%. A forming rate of 1.6 nm per minute and refractive index of 1.4 were achieved. The coating cracked under the longer treatment time.

Example 5

A CR39™ lens coated with Durlite coating was subjected to the plasma as in Example 1 for 20 minutes. The reflectance was dropped from 7.0% to 6.2% (average in the visible region) and the reflective curve was flat. There was no further drop by continued plasma treatment. The lowest refractive index obtained was only 1.45. The interference anti-reflective coating was not obtained.

Example 6

A CR39™ lens coated with tetraethoxysiloxane coating was subjected to the improved microwave plasma as in Example 1 for 20 minutes. No interference anti-reflective coating was obtained. The coating cracked under the longer treatment time.

Example 7

A CR39™ lens coated with Sakata coating was subjected to improved microwave plasma for 15 minutes in which parameters were the same as in Example 1. However, the plasma was not downstream. When the lens was round or circular, the plasma came from a range with 0°–90° according to the normal of the surface. The reflectance dropped from 6.9% to 1.1% at 550 nm. However, many hairline cracks appeared on the edge of the lens.

Example 8

A C39™ lens coated with Sakata coating was subjected to a nitrogen plasma with gas pressure 0.14 mbar and power at 400 watts for 50 minutes. The reflectance dropped to 1.2% at 550 nm. A forming rate of 6.4 nm per minute was achieved. The interference anti-reflective coating was obtained.

Example 9

A CR39™ lens coated with Sakata coating was subjected to an argon plasma for 65 minutes with parameters as given in Example 7. The reflectance dropped to 0.7% at 550 nm. A forming rate of 4.9 nm per minute was achieved. The interference anti-reflective coating was obtained.

Similar processes have been described with previous references. However, the results in this invention have not been achieved previously. Variations and modifications of the present invention will be obvious to those skilled in the art as follows.

What is claimed is:

1. A method of producing an optical article with durable interference anti-reflective coating, which has one or three quarter wavelength optical thickness at a wavelength from about 400 nm to about 1000 nm and a refractive index lower than 1.35 comprising:

(a) overcoating a plastic substrate with a hard coating with a thickness of 1–3μm comprising components A, B, C, D wherein Component A: from about 50 to about 800 parts by weight of at least one organic silicon compound selected from the group consisting of compounds represented by the general formula wherein $R^1$ is selected from the group consisting of alkoxyalkyl having 4 to 7 carbon atoms with at least a three carbon atom chain bonded directly to the silicon atom, and optionally substituted with vinyl, carbonate, carbonyl and methacryloyloxy; $R^2$ is selected from the group consisting of an alkyl having from one to four carbon atoms, and $R^3$ is selected from the group consisting of an alkyl group having from one to five carbon atoms, and hydrogen; and m is 0 or one;

Component B: about 100 parts by weight selected from the group consisting of colloidal silica or organic titanium compounds;

Component C: about 50 to about 600 parts by weight of at least one polyfunctional epoxy compound; and Component D: a curing catalyst from about 0.01 to about 5.0 percent by weight of a compound selected from the group consisting of magnesium perchlorate: ammonium perchlorate and ammonium chloride;

(b) exposing said hard coating coated plastic substrate to a downstream microwave plasma until one quarter or three quarter wavelength optical thickness is achieved; and (c) immersing said coated plastic substrate in a fluorine containing silane hydrophobic solution.

2. The method of claim 1 wherein the plastic substrate is transparent.

3. The method of claim 1 wherein the downstream microwave plasma generating region is within an angle of 0–30 degrees from a normal to the surface of the substrate.

4. The method of claim 1 wherein the plasma is performed in oxygen.

5. The method of claim 1 wherein the wavelength is from about 400 nm to about 900 nm.

6. The method of claim 1 wherein the one quarter wavelength optical thickness is from about 100 nm to about 225 nm.

7. The method of claim 1 wherein the three quarter wavelength optical thickness is from about 300 nm to about 675 nm.

8. The method according to claim 1 to produce the durable interference anti-reflective coating which has one or three-quarter wavelength optical thickness at the wavelength of from about 400 nm to about 900 nm and refractive index lower than about 1.35 comprising:

a compound having the general formula wherein A is a carbonate group with at least seven carbon atoms and 2 valence functionalities, $R^4$ and $R^5$ may be the same or different alkyl group having from 1 to 5 carbon atoms or alkoxyalkyl groups, and $R^6$ and $R^7$ are same or different alkyl groups having four to seven carbon atoms.

9. The method according to claim 1 to produce the durable interference anti-reflective coating, which has one or three quarter wavelength optical thickness at wavelength of from about 400 nm to about 900 nm and refractive index lower than about 1.35 which comprises overcoating a plastic substrate wherein Component A is from about 50 to about 800 parts by weight of at least one organic silicon compound selected from the group consisting of compounds represented by the general formula in which $R^8$ is selected from the group consisting of alkyl having 1–4 carbons, vinyl, carbonate and carbonyl;

$R^9$ is selected from the group consisting of methyl, ethyl, propenyl, methoxy and ethoxy; and $R^{10}$ is an alkyl group having 1 or 2 carbon atoms.

10. The method according to claim 1 to produce the durable interference anti-reflective coating, which has one or three quarter wavelength optical thickness from about 400 nm to about 900 nm and refractive index lower than about 1.35 which comprises overcoating a plastic substrate with the compound selected from the group consisting of (a) at least one organic silicon compound represented by the general formula $$R^1-\underset{\underset{R^2_m}{|}}{Si}-(OR^3)_{3-m}$$

wherein $R^1$ is selected from the group consisting of alkoxyalkyl having 4 to 7 carbon atoms with at least a three carbon atom chain bonded directly to the silicon atom, and optionally substituted with vinyl, carbonate, carbonyl and methacryloyloxy; $R^2$ is selected from the group consisting of an alkyl having from one to four carbon atoms and $R^3$ is selected from the group consisting of an alkyl group having from one to five carbon atoms, and hydrogen; and m is 0 or one; and (b) at least one member selected from the group consisting of an organic silicon compound represented by the general formula::

$$(R^4O)_2\underset{\underset{R^6}{|}}{Si}-A-\underset{\underset{R^7}{|}}{Si}(OR^5)_2$$

wherein A is a carbonate group with at least seven carbon atoms and 2 valence functionalities, $R^1$ and $R^2$ may be the same or different alkyl having from one to five carbon atoms, or alkoxyalkyl groups; and $R^6$ and $R^7$ are the same or different alkyl groups having four to seven carbon atoms.

* * * * *